United 3,814,714
Patented June 4, 1974

3,814,714
INDAZOLE PRESERVATIVES FOR AQUEOUS SYNTHETIC RESIN CONTAINING COMPOSITIONS
Pasquale P. Minieri, Woodside, N.Y., assignor to Tenneco Chemicals, Inc.
No Drawing. Continuation-in-part of abandoned application Ser. No. 201,194, Nov. 22, 1971. This application Apr. 24, 1972, Ser. No. 247,084
The portion of the term of the patent subsequent to Dec. 18, 1990, has been disclaimed
Int. Cl. C08d 11/00; C08f 45/64; C09d 5/14
U.S. Cl. 260—29.6 MN    18 Claims

ABSTRACT OF THE DISCLOSURE

Aqueous compositions that are subject to decomposition and spoilage by the action of bacteria are preserved by incorporating in them a small amount of a biocidal indazole.

---

This is a continuation-in-part of my copending application Ser. No. 201,194, which was filed on Nov. 22, 1971 and which has been abandoned.

This invention relates to a process for the preservation of aqueous compositions that are emulsions, dispersions, or solutions of organic substances that are subject to microbial attack.

Aqueous compositions of organic substances, such as latex paints, emulsified cutting oils, adhesives, hydraulic fluids, pulp dispersions used in paper making, and cosmetic soaps, creams, and lotions, in the absence of an effective preservative are subject to attack by putrefactive bacteria which results in a reduction in viscosity, development of color, development of foul odors, formation of slime, breaking of emulsions, and the possibility of skin infections in people handling these materials.

A number of materials have been proposed as preservatives for the organic substances in aqueous compositions, but none meets all of the requirements that have been established for such preservatives. For example, formaldehyde and formaldehyde-release compounds are relatively volatile and do not give long-term protection. Organic mercury compounds are very effective as preservatives, but their use is limited because of their high mammalian toxicity. In order to be useful as the preservative in aqueous compositions which are subject to spoilage resulting from the action of microorganisms, the compound must meet the following requirements: It should be effective against the microorganisms rapidly and at very low concentrations; it should be stable and soluble to some degree in water; it should be non-toxic and non-irritating to the skin in the amounts employed; it should be miscible with the organic solvents and other compounds that are commonly employed in the compositions subject to spoilage; it should be effective over a wide range of pH values so that it can be used in formulations of varied composition and pH; it should be free from objectionable odor; and it should be relatively low in cost.

In accordance with this invention, it has been found that indazole and a wide variety of substituted indazoles satisfy the foregoing requirements and are effective as preservatives for aqueous surface-coating compositions and other aqueous compositions that are subject to microbial attack. Among the indazoles that have been found to be effective as preservatives for aqueous compositions are those having the structural formula

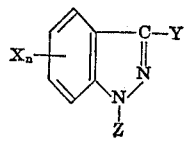

wherein

X represents halogen, nitro, acoyl, acoylamino, aroylamino, alkyleneimino having 1 to 8 carbon atoms, (halobenzylidene)amino, (alkylbenzylidene)amino, (hydroxybenzylidene)amino, (nitrobenzylidene)amino, lower alkyl, lower alkoxy, trihalomethyl, carboalkoxy, —$SO_2R$, or —$SO_3R$;

Y represents hydrogen, halogen, acoylamino, alkyleneimino having 1 to 8 carbon atoms, cyano, hydroxyl, carboalkoxy, or phenyl;

R represents lower alkyl, lower haloalkyl, phenyl, halophenyl, hydroxyphenyl, alkylphenyl, nitrophenyl, alkylamino, or amino;

$n$ represents a number in the range of zero to four; and

Z represents hydrogen or a group as hereinafter defined.

A preferred group of indazoles for use as preservatives for aqueous compositions includes those in which Z represents a group that hydrolyzes to some extent when the substituted indazole is incorporated into an aqueous composition to a hydrolysis product that comprises an indazole in which the Z substituent represents hydrogen. Particularly satisfactory results are obtained when the products of hydrolysis include at least one additional compound that has bactericidal activity, such as formaldehyde, acetaldehyde, acrolein, hexamethylenetetramine, or ethylene glycol. Among the many effective hydrolyzable compounds are those in which Z represents the group $$—CH_2—(ECH_2)_n—Z'$$

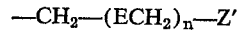

wherein E represents oxygen or sulfur; Z' represents hydroxyl, thiol, halogen, thiocyanato, thioalkyl, alkoxy, or acyloxy; and $n$ represents a number in the range of 0 to 4. The preferred compounds in this group are those in which E represents oxygen, Z' represents hydroxyl, halogen, or thiocyanato; and $n$ represents a number in the range of 0 to 2. The following are examples of these compounds:

$N^1$-hydroxymethyl-3-chloroindazole,
$N^1$-hydroxymethyl-5,7-dichloroindazole,
$N^1$-hydroxymethyl-6-acetaminoindazole,
$N^1$-chloromethyl-3-chloro-6-nitroindazole,
$N^1$-chloromethyl-5,6-dichloroindazole,
$N^1$-bromomethyl-3-bromo-6-nitroindazole,
$N^1$-iodomethyl-5-propionylaminoindazole,
$N^1$-thiocyanatomethyl-3-chloro-5-nitroindazole,
$N^1$-methoxymethyl-5,7-dibromoindazole,
$N^1$-acetoxymethyl-3,5,7-trichloroindazole,
$N^1$-mercaptomethyl-5,6-dichloroindazole,
$N^1$-acetoxymethoxymethyl-5-chloroindazole, and
$N^1$-propionoxymeththiomethyl-3,5,7-trichloroindazole.

In another group of hydrolyzable substituted indazoles, Z represents the group $$—(CH_2)_c(CR'R'')_aZ'$$

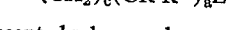

wherein R' represents hydrogen, lower alkyl, lower nitroalkyl, lower haloalkyl, phenyl, nitrophenyl, hydroxyphenyl, halophenyl, alkylphenyl, alkenyl having 2 to 4 carbon atoms, alkynyl having 2 to 4 carbon atoms, or cycloalkyl having 3 to 8 carbon atoms; R'' represents hydrogen or lower alkyl; $a$ represents 1 or 2; $c$ represents 0 or 1; and Z' has the aforementioned significance. The preferred compounds in this group are those in which R' is hydrogen, methyl, or ethyl; R'' is hydrogen; Z' is hydroxyl, halogen, or thiocyanato; $a$ is 1; and $c$ is 0 or 1. Examples of these compounds include the following:

$N^1$-(2-hydroxyethyl)-3-chloroindazole,
$N^1$-(2-hydroxyethyl)-3-chloro-5-nitroindazole,
$N^1$-(2-hydroxyethyl)-5,7-dichloroindazole,
$N^1$-(2-chloroethyl)-5,6-dinitroindazole, N¹-(2-thiocyanatoethyl)-6-nitroindazole,
N¹-(3-hydroxypropyl)-6-acetaminoindazole,
N¹-(3-hydroxyisobutyl)-3-methyleneiminoindazole,
N¹-(3-chloropropyl)-6-methoxyindazole,
N¹-(2-hydroxypropyl)-5,6-dichloroindazole,
N¹-(2-thiocyanatobutyl)-3-chloroindazole,
N¹-(3-hydroxy-2,2,3-trimethylbutyl)indazole,
N¹-(1-hydroxyethyl)-3,5,7-trichloroindazole,
N¹-(1-hydroxypropyl)-6-acetaminoindazole,
N¹-(1-chloroethyl)-4-methyl-7-chloroindazole,
N¹-(2-hydroxy-2-phenylethyl)-5-chloroindazole, and
N¹-[2-hydroxy-2-(p-hydroxyphenyl)ethyl]-5,7-dichloroindazole.

A third group of hydrolyzable indazoles includes those in which Z prepresents the group

—CH₂—L wherein L represents —NR''—N(R'')₂; —N=R'''; —N₄(CH₂)₆⁺Q⁻;

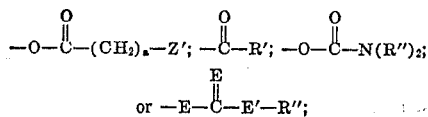

R''' represents alkylene having 1 to 8 carbon atoms; E' represents sulfur when E represents oxygen and oxygen when E represents sulfur; and R', R'', Q, Z' and a have the significance indicated elsewhere. Illustrative of these compounds are the following:

1,1-dimethyl-2-(6-acetaminoindazolyl-N¹-methyl)hydrazine;
1,1-diethyl-2-(3,5-dibromoindazolyl-N¹-methyl)hydrazine;
1,1-dimethyl-2-(3,5,7-trichloroindazolyl-N¹-methyl)hydrazine;
1,1,2-trimethyl-2-(7-chloroindazolyl-N¹-methyl)hydrazine;
1,1,2-triethyl-(3-chloro-6-acetaminoindazolyl-N¹-methyl)hydrazine;
N-(3-chloroindazolyl-N¹-methyl)piperidine;
N-(3-chloro-5-nitroindazolyl-N¹-methyl)piperidine;
N-(5,6-dinitroindazolyl-N¹-methyl)piperidine;
N-(5-chloroindazolyl-N¹-methyl)-3-methylpiperidine;
N-(5,7-dichloroindazolyl-N¹-methyl)hexamethyleneimine;
N-(3,5-dichloroindazolyl-N¹-methyl)hexamethyleneimine;
N-(3-chloro-6-acetaminoindazolyl-N¹-methyl)hexamethyleneimine;
N-(3-bromoindazolyl-N¹-methyl)hexamethylenetetraammonium bromide;
N-(6-acetaminoindazolyl-N¹-methyl)hexamethylenetetraammonium iodide;
N-[6-(3,4-dichlorobenzylidene)aminoindazolyl-N¹-methyl]hexamethylenetetraammonium chloride;
N-(3,5,7-trichloroindazolyl-N¹-methyl)hexamethylenetetraammonium chloride;
N¹-chloroacetoxymethyl-5-chloroindazole;
N¹-bromoacetoxymethyl-5-nitroindazole;
N¹-thiocyanatoacetoxymethyl-5,7-dibromoindazole;
N¹-trifluoroacetoxymethyl-3-fluoro-6-acetaminoindazole;
N¹-chloroacetoxymethyl-3,5,7-trichloroindazole;
N¹-(p-chlorobenzoylmethyl)-3-chloroindazole;
N¹-(2,6-dichlorobenzoylmethyl)-5,7-dichloroindazole;
(3-chloroindazolyl-N¹-methyl)-N-methyl carbamate;
(5,7-dichloroindazolyl-N¹-methyl)-N-ethyl carbamate;
S-ethyl O-(5-chloroindazolyl-N¹-methyl)thiolcarbonate;
S-ethyl S-(3-chloro-6-nitroindazolyl-N¹-methyl)dithiocarbonate;
S-methyl O-(5,7-dichloroindazolyl-N¹-methyl)thiolcarbonate;
O-methyl S-(3,5,7-trichloroindazolyl-N¹-methyl)dithiocarbonate; and
O-ethyl S-(6-acetaminoindazolyl-N¹-methyl)dithiocarbonate.

Another group of substituted indazoles that are effective as preservatives for aqueous compositions and particularly aqueous surface-coating compositions includes those in which Z represents a haloalkylmercapto group that has the structure —S—C$_a$Q$_b$H$_{(2a-b+1)}$ wherein a is 1 or 2, b is 3 when a is 1 and 4 when a is 2, and Q is halogen. The following are examples of these compounds:

N¹-trichloromethylmercaptoindazole,
N¹-trichloromethylmercapto-3-chloroindazole,
N¹-trichloromethylmercapto-5-chloroindazole,
N¹-trichloromethylmercapto-5,7-dichloroindazole,
N¹-trichloromethylmercapto-6-nitroindazole,
N¹-tribromomethylmercapto-6-(3,4-dibromobenzylidene)aminoindazole,
N¹-triiodomethylmercapto-4-methyl-7-hexamethyleneiminoindazole,
N¹-fluoromethylmercapto-6-fluoromethylindazole,
N¹-tetrachloroethylmercapto-5,7-dichloroindazole,
N¹-tetrabromoethylmercapto-3,4,5,6,7-pentabromoindazole,
N¹-tetraiodoethylmercapto-7-iodoindazole,
N¹-tetrafluoroethylmercapto-6-acetaminoindazole,
N¹-tetrachloroethylmercapto-3-methyleneimino-6-methoxyindazole, and the like.

Another preferred group of substituted indazoles for use in the preservation of aqueous compositions includes those compounds in which Z represents the group

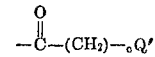

wherein Q' represents —OH, —SH, —OR, —SR, —NHR, —SCN, halogen, alkyleneimino having 1 to 8 carbon atoms, or trihalomethyl; c represents 0 or 1; and R represents amino, alkylamino, lower alkyl, lower haloalkyl, phenyl, or substituted phenyl wherein the substituent is alkyl, hydroxyl, halogen, or nitro. Illustrative of these compounds are the following:

N¹-chloroacetyl-4-chloroindazole,
N¹-chloroacetyl-4-nitroindazole,
N¹-bromoacetyl-3-bromoindazole,
N¹-chloroacetyl-7-fluoroindazole,
N¹-iodoacetyl-3,6-diiodoindazole,
N¹-phenoxyacetyl-6-nitroindazole,
N¹-phenoxyacetyl-3,7-dibromoindazole,
N¹-thiocyanatoacetyl-4,6-dichloroindazole,
N¹-thiocyanatoacetyl-3,5,7-trichloroindazole,
N¹-thiocyanatoacetyl-3-chloro-5,6-di-[(3,4-dichlorobenzylidene)amino]indazole,
N¹-thiocyanatoacetyl-3-chloro-6-nitroindazole,
N¹-chloroacetyl-5-chloroindazole,
N¹-chloroacetyl-5,7-dichloroindazole,
N¹-carbothioethoxy-6-acetaminoindazole,
N¹-carbothioethoxy-3-chloro-6-nitroindazole,
N¹-carbothioethoxy-3,5,7-trichloroindazole,
N¹-carbothioethoxy-5,6-dinitroindazole,
N¹-carbothiophenoxy-3-chloro-6-nitroindazole,
N¹-(3,4-dichlorobenzoyl)-6-nitroindazole,
N¹-(3,4-dichlorobenzoyl)-3-chloro-5-nitroindazole,
N¹-(3,4-dichlorobenzoyl)-6-[(3,4-dichlorobenzylidene)amino]indazole,
N¹-(3-nitrobenzoyl)-3,5-dichloroindazole,
N¹-salicoyl-6-acetaminoindazole,
N¹-trifluoromethylacetyl-6-nitroindazole,
N¹-(N-methylcarbamyl)-6-nitroindazole,
N¹-carboxy-5-chloroindazole,
N¹-(N-n-butylcarbamyl)-5-chloroindazole,
N¹-(N-n-butylcarbamyl)-5-chloroindazole, N¹-(N-n-butylcarbamyl)-5,6-dinitroindazole,
N¹-[N-(3,4-dichlorophenyl)carbamyl]-6-nitroindazole,
N¹-[N-(3,4-dichlorophenyl)carbamyl]-6-(3,4-dichlorobenzylidene)aminoindazole,
N¹-thiolacetyl-5,7-dichloroindazole,
N¹-glycolyl-3-chloro-6-acetaminoindazole,
N¹-(p-hydroxybenzoyl)-3,5-dichloroindazole, and the like.

The indazoles in which Z represents hydrogen constitute another preferred group of preservatives for aqueous compositions. Examples of these compounds are the following:

indazole,
3-chloroindazole,
5-chloroindazole,
6-chloroindazole,
7-chloroindazole,
3,5-dichloroindazole,
3,5,6-trichloroindazole,
5,7-dichloroindazole,
5-nitroindazole,
3-chloro-5-nitroindazole,
3-bromo-5-nitroindazole,
3-hydroxyindazole,
3-cyanoindazole,
3-phenylindazole,
6-nitroindazole,
3-chloro-6-nitroindazole,
4,5,7-trichloroindazole,
3-methyleneimino-7-chloroindazole,
6-(3,4-dichlorobenzylideneamino)indazole,
6-(4-acetaminobenzylideneamino)indazole,
6-(4-hydroxybenzylideneamino)indazole,
6-(3-nitrobenzylideneamino)indazole,
6-(3-nitro-4-chlorobenzylideneamino)indazole,
5-(3,4-dichlorobenzylideneamino)indazole,
5-(3-nitro-4-chlorobenzylideneamino)indazole,
5-(2,5-dimethoxybenzylideneamino)indazole,
5-(4-acetaminobenzylideneamino)indazole,
6-(2,5-dimethoxybenzylideneamino)indazole, and
6-(3,5-dichlorosalicylideneamino)indazole.

The substituted indazoles that are used in the practice of this invention may be prepared by any suitable and convenient procedure. For example, the N¹-hydroxymethyl compounds may be prepared by heating the appropriate substituted indazoles with formaldehyde or a formaldehyde-yielding material, and the N¹-chloromethyl compounds may be prepared by heating the appropriate N¹-hydroxymethyl compounds with thionyl chloride. These reactions are generally carried out in a solvent, such as benzene, toluene, xylene, acetone, pyridine, or ethylene chloride, at the reflux temperature of the reaction mixture. The preparation and properties of many of these compounds are described in my Pats. U.S. 3,637,736 and U.S. 3,641,050.

In a preferred embodiment of this invention, the substituted indazoles are used as the preservative in a wide variety of aqueous surface-coating compositions. The aqueous coating compositions that contain these substituted indazoles are stable and do not show signs of degradation caused by bacterial activity after storage at room temperature for 6 months or more. Because they provide long-lasting protection against bacterial activity without adversely affecting the pH, viscosity, drying characteristics, color, odor, and other properties of the surface-coating compositions, the preferred indazoles for use in surface-coating compositions are those that have the structural formula

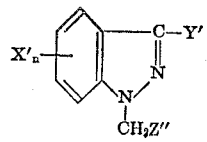

wherein X' represents chlorine or acetamino; Y' represents hydrogen or chlorine; Z" represents hydroxyl or chlorine; and n represents a number in the range of 0 to 4. Examples of these most effective bactericides include N¹-hydroxymethyl-3-chloroindazole,
N¹-hydroxymethyl-5-chloroindazole,
N¹-hydroxymethyl-5,7-dichloroindazole,
N¹-hydroxymethyl-3,5,7-trichloroindazole,
N¹-hydroxymethyl-4,5,6,7-tetrachlorindazole,
N¹-hydroxymethyl-3,4,5,6-7-pentachloroindazole,
N¹-hydroxymethyl-6-acetaminoindazole,
N¹-chloromethyl-7-chloroindazole,
N¹-chloromethyl-3-chloro-6-acetaminoindazole, and
N¹-chloromethyl-5,7-dichloroindazole.

The surface-coating compositions to which the substituted indazoles may be added as preservatives are aqueous dispersions that contain about 10 percent to 60 percent by weight of a water-insoluble resinous binder that is a synthetic linear addition polymer and/or an oleoresinous binder. The useful aqueous dispersions of synthetic linear addition polymers are ordinarily prepared by the emulsion polymerization of ethylenically-unsaturated monomers. Illustrative of these polymers are polyvinyl acetate; polyvinyl butyrate; polyvinyl chloride; copolymers of vinyl acetate with vinyl chloride or acrylonitrile; copolymers of vinyl chloride with acrylonitrile or vinylidene chloride; polyethylene; polyisobutylene; copolymers of styrene with butadiene, acrylonitrile, or maleic anhydride; copolymers of acrylic acid esters or methacrylic acid esters of alcohols having 1 to 8 carbon atoms with vinyl acetate, vinyl chloride, acrylonitrile, or styrene; copolymers of the aforementioned acrylic acid esters, the aforementioned methacrylic acid esters, and acrylic acid; and mixtures thereof. Suitable oleoresinous binders include drying oils, bodied drying oils, oleoresinous varnishes, alkyd resins, and mixtures thereof.

Only a small amount of the bactericidal indazole is required to protect the aqueous surface-coating composition from attack by bacteria. As little as 0.10 percent of one or more of these compounds, based on the weight of the composition, will bring about an appreciable improvement in the resistance of the composition to attack by bacteria. One percent or more of the bactericidal compounds can be used, but these larger amounts ordinarily do not provide further improvement in the properties of the compositions and for this reason are not usually used. While the amount of the substituted indazoles that will provide optimum protection for an aqueous surface-coating composition depends upon such factors as the choice of indazole, the choice of resinous binder and other ingredients of the composition and the amount of each of these materials that is used, it is generally preferred to use 0.2 percent to 0.4 percent of the bactericidal indazole, based on the weight of the surface-coating composition.

In addition to the resinous binder and the bactericidal compound, the surface-coating compositions may contain various auxiliary materials, such as pigments, extenders, solvents, dyes, defoaming agents, driers, thickeners, emulsifiers, plasticizers, and the like in the amounts ordinarily used for these purposes.

The bactericidal indazoles may be incorporated into the surface-coating compositions by any convenient procedure. For example they can be combined with the pigments and other ingredients to form a pigment phase that is mixed with the resinous binder and water to form the surface-coating composition. Alternatively, they can be added to a composition that contains the resinous binder, pigment, and water. The indazoles can be added as such to the other ingredients, or they can be added as a solution in, for example, an alcohol, ether, hydrocarbon, or ketone.

The invention is further illustrated by the following examples.

EXAMPLE 1

A. A polyvinyl acetate latex paint was prepared by mixing together the following materials:

| | Parts by weight |
|---|---|
| Water | 481.5 |
| 25% aqueous solution of sodium salt of maleic anhydride/diisobutylene copolymer | 24 |
| Potassium pyrophosphate | 3 |
| Long chain fatty acid alkanolamide | 9 |
| Defoamer | 6 |
| Ethylene glycol | 75 |
| 1¼% aqueous solution of Hydroxyethylcellulose | 375 |
| Aqueous emulsion containing 55% of polyvinyl acetate | 1299 |
| Diethyl ether of diethylene glycol | 30 |
| Titanium dioxide | 690 |
| Talc | 345 |
| Calcium metasilicate | 150 |

This paint had the following properties as determined by standard paint testing procedures:

| | | |
|---|---|---|
| Viscosity | K.U. | 65 |
| Brookfield viscosity (No. 4 spindle, 60 r.p.m.) | cps | 800 |
| pH | | 7.8 |
| Yellowness index | | 3.0 |

Small amounts of the bactericidal indazoles of this invention or comparative biocides were added to portions of this paint, and the resulting treated paints were mixed for 24 hours on a ball-mill.

B. The paints prepared in Example 1A were evaluated by the following procedures:

A mixed bacterial inoculum consisting of *Pseudomonas aeruginosa* ATCC 10145, *Aerobacter aerogenes* ATCC 7256, *Bacillus subtilis*, *Bacillus megsterium* and *Bacillus licheniformis* was prepared by incubation of inoculated (0.5 ml.) milk dilution bottles containing 50 ml. of solidified Trypticase-Soy Agar.

After incubation for 18 to 24 hours at 35° C., the cultures were removed from the agar surface, diluted to an appropriate volume in phosphate buffer (0.05 M, pH 7.0), and inoculated into 300 gram portions of the test paints. The amount of the culture added to the paint was such that the final level of bacteria was between $0.5 \times 10^6$ and $3 \times 10^6$ per gram of paint. After thorough mixing, the paints were incubated at 35° C. under 90 percent relative humidity. At intervals during the incubation, measurements of viability of the bacteria and viscosity of the paint were made. The viability test was carried out by adding an aliquot of the paint to Trypticase-Soy Broth, incubating for 48 hours at 35° C., and then streaking it on a Trypticase-Soy Agar plate. After a 24 hour incubation period at 35° C., the plates were examined for growth along the streak. The results obtained are reported in Table I as + (growth present) or − (growth absent). The viscosity of the paint samples was measured with a Brookfield Viscometer using a No. 3 spindle at 60 r.p.m. The percentage decrease of the viscosity of each of the treated paints during the incubation period is reported in Table I.

TABLE I.—SUBSTITUTED INDAZOLES AS PRESERVATIVES FOR POLYVINYL ACETATE LATEX PAINT

| Example number | Biocide | Concentration of biocide (percent) | Viability incubation period (days) | | | | | Percent total decrease in viscosity Incubation period (days) | | | | |
|---|---|---|---|---|---|---|---|---|---|---|---|---|
| | | | 1 | 2 | 5 | 12 | 21 | 1 | 2 | 5 | 12 | 21 |
| 1A | N¹-hydroxymethyl-3-chloroindazole | 0.4 | + | + | − | − | − | 8 | 10 | 15 | 17 | 15 |
| | | 0.1 | + | + | + | − | − | 14 | 20 | 29 | 32 | 35 |
| 1B | N¹-hydroxymethyl-5-chloroindazole | 0.4 | + | + | − | − | − | 12 | 15 | 18 | 20 | 23 |
| | | 0.1 | + | + | + | − | − | 20 | 26 | 30 | 35 | 40 |
| 1C | N¹-hydroxymethyl-3,5-dichloroindazole | 0.4 | + | + | − | − | − | 6 | 8 | 11 | 11 | 10 |
| | | 0.1 | + | + | + | − | − | 14 | 18 | 25 | 26 | 28 |
| 1D | N¹-hydroxymethyl-5,7-dichloroindazole | 0.4 | + | + | + | − | − | 12 | 16 | 26 | 30 | 32 |
| | | 0.1 | + | + | + | + | + | 19 | 24 | 30 | 36 | 40 |
| 1E | N¹-hydroxymethyl-5-nitroindazole | 0.4 | + | + | − | − | − | 8 | 13 | 15 | 20 | 22 |
| | | 0.1 | + | + | + | − | − | 12 | 18 | 23 | 37 | 38 |
| 1F | N¹-hydroxymethyl-6-nitroindazole | 0.4 | + | + | − | − | − | 5 | 8 | 10 | 14 | 16 |
| | | 0.1 | + | + | + | − | − | 5 | 11 | 20 | 30 | 33 |
| 1G | N¹-hydroxymethyl-5,6-dinitroindazole | 0.4 | + | + | − | − | − | 3 | 5 | 12 | 15 | 19 |
| | | 0.1 | + | + | + | − | − | 10 | 12 | 20 | 32 | 38 |
| 1H | N¹-hydroxymethyl-3-chloro-5-nitroindazole | 0.4 | + | + | − | − | − | 10 | 13 | 17 | 21 | 25 |
| | | 0.1 | + | + | + | − | − | 10 | 15 | 19 | 30 | 40 |
| 1I | N¹-hydroxymethyl-6-acetaminoindazole | 0.4 | + | + | + | − | − | 10 | 13 | 18 | 23 | 29 |
| | | 0.1 | + | + | + | + | − | 15 | 22 | 35 | 49 | 52 |
| 1J | N¹-chloromethyl-6-nitroindazole | 0.4 | + | + | + | − | − | 8 | 10 | 18 | 22 | 25 |
| | | 0.1 | + | + | + | + | − | 10 | 15 | 28 | 36 | 40 |
| 1K | N¹-chloromethyl-3-chloro-5-nitroindazole | 0.4 | + | + | + | − | − | 8 | 19 | 24 | 30 | 35 |
| | | 0.1 | + | + | + | + | − | 15 | 20 | 36 | 45 | 50 |
| 1L | N¹-chloromethyl-3-chloro-6-nitroindazole | 0.4 | + | + | − | − | − | 6 | 9 | 11 | 16 | 17 |
| | | 0.1 | + | + | + | − | − | 10 | 19 | 28 | 33 | 30 |
| 1M | N¹-chloromethyl-5,6-dinitroindazole | 0.4 | + | + | − | + | − | 2 | 6 | 8 | 9 | 10 |
| | | 0.1 | + | + | + | + | − | 18 | 21 | 35 | 38 | 40 |
| 1N | N-(5-nitroindazolyl-N¹-methyl)piperidine | 0.4 | + | + | + | − | − | 8 | 10 | 16 | 22 | 25 |
| | | 0.1 | + | + | + | + | + | 18 | 24 | 36 | 43 | 50 |
| 1O | N-(3-chloro-5-nitroindazolyl-N¹-methyl)piperidine | 0.4 | + | + | + | − | − | 8 | 16 | 20 | 28 | 32 |
| | | 0.1 | + | + | + | + | − | 22 | 30 | 39 | 48 | 52 |
| 1P | N-(6-nitroindazolyl-N¹-methyl)piperidine | 0.4 | + | + | + | − | − | 5 | 12 | 19 | 22 | 25 |
| | | 0.1 | + | + | + | + | − | 19 | 28 | 46 | 52 | 55 |
| 1Q | N-(5,6-dinitroindazolyl-N¹-methyl)piperidine | 0.4 | + | + | + | − | − | 12 | 15 | 22 | 26 | 30 |
| | | 0.1 | + | + | + | + | − | 25 | 38 | 42 | 48 | 50 |
| 1R | N-(3-chloroindazolyl-N¹-methyl)hexamethyleneimine | 0.4 | + | + | + | − | − | 6 | 8 | 12 | 20 | 25 |
| | | 0.1 | + | + | + | + | + | 21 | 28 | 40 | 50 | 56 |
| 1S | N-(5-nitroindazolyl-N¹-methyl)hexamethyleneimine | 0.4 | + | + | − | − | − | 8 | 12 | 18 | 20 | 21 |
| | | 0.1 | + | + | + | − | − | 16 | 20 | 25 | 36 | 6 |

TABLE I—Continued

| Example number | Biocide | Concentration of biocide (percent) | Viability incubation period (days) | | | | | Percent total decrease in viscosity Incubation period (days) | | | | |
|---|---|---|---|---|---|---|---|---|---|---|---|---|
| | | | 1 | 2 | 5 | 12 | 21 | 1 | 2 | 5 | 12 | 21 |
| 1T | N-(3-chloro-5-nitroindazolyl-N¹-methyl)-hexamethyleneimine. | 0.4 | + | + | + | − | − | 15 | 22 | 28 | 32 | 35 |
| | | 0.1 | + | + | + | + | − | 25 | 36 | 45 | 50 | 50 |
| 1U | N-(3-chloro-6-nitroindazolyl-N¹-methyl)-hexamethylene tetraammonium chloride. | 0.4 | + | + | − | − | − | 3 | 8 | 12 | 15 | 19 |
| | | 0.1 | + | + | + | − | − | 15 | 19 | 22 | 30 | 35 |
| Comp. Ex. A | Formaldehyde (37% stabilized) | 0.4 | + | + | − | − | − | 7 | 14 | 16 | 29 | 27 |
| | | 0.1 | + | + | − | − | − | 11 | 37 | 44 | 56 | 54 |
| Comp. Ex. B | Phenylmercuric acetate (18% Hg) | 0.1 | + | − | − | − | − | 0 | 2 | 5 | 8 | 8 |
| | | 0.05 | + | + | − | − | − | 8 | 12 | 15 | 18 | 20 |
| Comp. Ex. C | None | | + | + | + | + | + | 35 | 50 | 67 | 65 | 65 |

EXAMPLE 2

A. An acrylic latex paint was prepared by mixing together the following materials:

| | Parts by weight |
|---|---|
| Water | 168 |
| Alkyl aryl ether surfactant | 6 |
| 25% aqueous solution of sodium salt of maleic anhydride/diisobutylene copolymer | 27 |
| Defoamer | 12 |
| 2% aqueous solution of hydroxyethylcellulose | 300 |
| Ethylene glycol | 60 |
| Titanium dioxide | 750 |
| Mica (waterground) | 90 |
| Calcium carbonate | 375 |
| Ammonium hydroxide (28%) | 6 |
| Aqueous dispersion containing 46% acrylic ester copolymer (66% ethyl acrylate, 32.5% methyl acrylate, and 1.5% acrylic acid) | 1642 |

This paint had the following properties:

| | |
|---|---|
| Viscosity K.U. | 72 |
| Brokfield viscosity (No. 3 spindle, 60 r.p.m.) cps. | 1250 |
| pH | 9.2 |
| Yellowness index | 2.6 |

Small amounts of the biocidal compounds of this invention or comparative biocides were added to portions of this paint, and the resulting treated paints were mixed for 24 hours on a ball-mill.

B. The paints prepared by the foregoing procedure were evaluated by the test procedures described in Example 1B. The results obtained are given in Table II.

EXAMPLE 3

A cosmetic lotion was prepared from the following materials:

| | Parts by weight |
|---|---|
| Petrolatum | 7.5 |
| Mineral oil | 37.5 |
| Beeswax | 2.0 |
| Polyoxyethylene sorbitol lanolin derivative (Atlas G-1425) | 4.5 |
| Sorbitan sesquioleate | 2.0 |
| Water | 46.2 |
| N¹-hydroxymethyl-3,5-dichloroindazole | 0.3 |

All of the ingredients except the preservative and water were heated together to 75° C., and the remaining ingredients were heated together to 77° C. The aqueous phase was added to the non-aqueous phase slowly with stirring which was continued until the preparation had cooled to room temperature.

After standing for 2 weeks at room temperature, the lotion showed no sign of bacterial growth.

EXAMPLE 4

An aqueous cutting oil emulsion was prepared by the following procedure: A mixture of a light mineral oil, an organic emulsifier, an aliphatic alcohol coupling agent, and minor amounts of other components was diluted with forty parts of water per part of said mixture to form an emulsion. To a sample of this emulsion was added 0.3 percent by weight of N¹-hydroxymethyl-5,7-dichloroindazole and 5 percent by weight of a cutting oil emulsion which was badly contaminated with bacterial growth after

TABLE II.—SUBSTITUTED INDAZOLES AS PRESERVATIVES FOR ACRYLIC LATEX PAINT

| Example number | Biocide | Concentration of biocide (percent) | Viability incubation period (days) | | | | | Percent total decrease in viscosity Incubation period (days) | | | | |
|---|---|---|---|---|---|---|---|---|---|---|---|---|
| | | | 1 | 2 | 5 | 12 | 21 | 1 | 2 | 5 | 12 | 21 |
| 2A | N¹-hydroxymethyl-3-chloroindazole | 0.4 | + | + | + | − | − | 5 | 5 | 8 | 10 | 10 |
| | | 0.1 | + | + | + | − | − | 0 | 0 | 7 | 10 | 10 |
| 2B | N¹-hydroxymethyl-5-chloroindazole | 0.4 | + | + | + | − | − | 0 | 5 | 8 | 8 | 10 |
| | | 0.1 | + | + | + | + | − | 6 | 8 | 10 | 15 | 19 |
| 2C | N¹-hydroxymethyl-3,5-dichloroindazole | 0.4 | + | + | + | − | − | 5 | 8 | 8 | 10 | 11 |
| | | 0.1 | + | + | + | + | − | 5 | 8 | 10 | 10 | 10 |
| 2D | N¹-hydroxymethyl-5,7-dichloroindazole | 0.4 | + | + | + | + | − | 5 | 5 | 8 | 10 | 13 |
| | | 0.1 | + | + | + | + | + | 9 | 12 | 15 | 16 | 20 |
| 2E | N¹-hydroxymethyl-6-acetaminoindazole | 0.4 | + | + | + | − | − | 2 | 5 | 8 | 12 | 15 |
| | | 0.1 | + | + | + | + | − | 5 | 9 | 13 | 19 | 22 |
| 2F | N¹-chloromethyl-3-chloro-6-nitroindazole | 0.4 | + | + | + | − | − | 5 | 5 | 6 | 6 | 8 |
| | | 0.1 | + | + | + | − | − | 5 | 9 | 9 | 10 | 12 |
| 2G | N¹-chloromethyl-5,6-dinitroindazole | 0.4 | + | + | + | − | − | 5 | 5 | 10 | 10 | 11 |
| | | 0.1 | + | + | + | − | − | 8 | 10 | 11 | 13 | 15 |
| 2H | N-(5-nitroindazolyl-N¹-methyl)hexamethyleneimine | 0.4 | + | + | + | − | − | 3 | 8 | 10 | 11 | 13 |
| | | 0.1 | + | + | + | + | − | 6 | 9 | 13 | 15 | 22 |
| Comp. Ex. D | Formaldehyde (37% stabilized) | 0.4 | + | + | + | + | + | 6 | 7 | 8 | 10 | 10 |
| | | 0.1 | + | + | + | + | + | 4 | 8 | 10 | 12 | 15 |
| Comp. Ex. E | Phenylmercuric acetate (18% Hg) | 0.1 | + | + | − | − | − | 0 | 2 | 3 | 2 | 2 |
| | | 0.05 | + | + | + | − | − | 2 | 5 | 6 | 8 | 10 |
| Comp. Ex. F | None | | + | + | + | + | + | 5 | 10 | 17 | 20 | 25 | industrial use. The inoculated sample was shaken at room temperature. After 24 hours and 48 hours swabs of the sample were streaked on nutrient agar plates which were incubated for 48 hours at 30° C. before examination. In neither case was there bacterial growth on the agar plates.

Each of the other indazoles disclosed herein can be used in a similar manner to prevent the growth of bacteria in aqueous compositions that contain organic materials that are subject to deterioration by the action of bacteria.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

I claim:

1. An aqueous surface-coating composition that is resistant to spoilage by the action of bacteria that consists essentially of (a) a water-insoluble resinous binder prepared by the emulsion polymerization of ethylenically-unsaturaed monomers selected from the group consisting of vinyl acetate, vinyl butyrate, vinyl chloride, acrylonitrile, vinylidene chloride, ethylene, isobutylene, styrene, butadiene, acrylic acid esters or methacrylic acid esters of alcohols having 1 to 8 carbon atoms, and mixtures thereof and (b) 0.1 percent to 1.0 percent, based on the weight of said composition, of a bactericidal compound having the structural formula

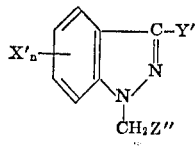

wherein $X'$ represents chlorine or acetamino; $Y'$ represents hydrogen or chlorine; $Z''$ represents hydroxyl or chlorine; and $n$ represents a number in the range of 0 to 4.

2. An aqueous surface-coating composition as set forth in claim 1 wherein $Z''$ represents hydroxyl.
3. An aqueous surface-coating composition as set forth in claim 1 wherein $X'$ represents chlorine:
4. An aqueous surface-coating composition as set forth in claim 1 wherein the bactericidal compound is $N^1$-hydroxymethyl-5-chloroindazole.
5. An aqueous surface-coating comopsition as set forth in claim 1 wherein the bactericidal compound is $N^1$-hydroxymethyl-3,5-dichloroindazole.
6. An aqueous surface-coating composition as set forth in claim 1 wherein the bactericidal compound is $N^1$-hydroxymethyl-5,7-dichloroindazole.
7. An aqueous surface-coating composition as set forth in claim 1 wherein the bactericidal compound is $N^1$-hydroxymethyl-4,5,7-trichloroindazole.
8. An aqueous surface-coating composition as set forth in claim 1 that contains about 10 percent to 60 percent by weight of said water-insoluble resinous binder.
9. An aqueous surface-coating composition as set forth in claim 1 that contains 0.2 percent to 0.4 percent by weight of said bactericidal compound.
10. A surface-coating composition that is resistant to the action of bacteria that comprises an aqueous composition consisting essentially of about 10 percent to 60 percent by weight of polyvinyl acetate and 0.1 percent to 1.0 percent by weight of $N^1$-hydroxymethyl-5,7-dichloroindazole.

11. The process for preventing bacteria-caused spoilage in an aqueous surface-coating composition that is normally subject to such spoilage, said aqueous composition consisting essentially of a water-insoluble resinous binder prepared by the emulsion polymerization of ethylenically-unsaturated monomers selected from the group consisting of vinyl acetate, vinyl butyrate, vinyl chloride, acrylonitrile, vinylidene chloride, ethylene, isobutylene, styrene, butadiene, acrylic acid esters or methacrylic esters of alcohols having 1 to 8 carbon atoms, and mixtures thereof, that comprises incorporating in said composition 0.1 percent to 1.0 percent, based on the weight of the composition, of a bactericidal compound having the structural formula

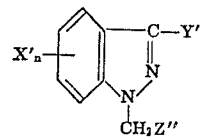

wherein $X'$ represents chlorine or acetamino, $Y'$ represents hydrogen or chlorine, $Z''$ represents hydroxyl or chlorine, and $n$ represents a number in the range of 0 to 4.

12. The process of claim 11 wherein $Z''$ represents hydroxyl.
13. The process of claim 11 wherein $X'$ represents chlorine.
14. The process of claim 11 wherein the bactericidal compound is $N^1$-hydroxymethyl-5-chloroindazole.
15. The process of claim 11 wherein the bactericidal compound is $N^1$-hydroxymethyl-3,5-dichloroindazole.
16. The process for preventing bacteria-caused spoilage in an aqueous surface-coating composition that is normally subject to such spoilage, said aqueous composition consisting essentially of a water-insoluble resinous binder prepared by the emulsion polymerization of ethylenically-unsaturated monomers selected from the group consisting of vinyl acetate, vinyl butyrate, vinyl chloride, acrylonitrile, vinylidene chloride, ethylene, isobutylene, styrene, butadiene, acrylic acid esters or methacrylic acid esters of alcohols having 1 to 8 carbon atoms, and mixtures thereof, that comprises incorporating in said composition 0.1 percent to 1.0 percent, based on the weight of the composition, of $N^1$-hydroxymethyl-5,7-dichloroindazole.
17. The process of claim 11 wherein the bactericidal compound is $N^1$-hydroxymethyl-4,5,7-trichloroindazole.
18. The process of claim 11 wherein the bactericidal compound is $N^1$-hydroxymethyl-6-acetaminoindazole.

References Cited
UNITED STATES PATENTS

| | | | |
|---|---|---|---|
| 3,317,448 | 5/1967 | Prindle et al. | 260—29.6 MN |
| 3,325,436 | 6/1967 | Prindle et al. | 260—29.6 MN |

LUCILLE M. PHYNES, Primary Examiner

U.S. Cl. X.R.

106—15 R; 260—17 R, 29.6 HN & N, 29.7 N, 41 A & B, 78.5 R & T, 83.7, 85.5 ES & XA, 86.1 E, 89.1, 92.8 A, 94.8, 94.9 A & GB; 424—78, 81, 244, 273, 365